(12) United States Patent
Jayasimha et al.

(10) Patent No.: US 8,798,038 B2
(45) Date of Patent: Aug. 5, 2014

(54) EFFICIENT HEADER GENERATION IN PACKETIZED PROTOCOLS FOR FLEXIBLE SYSTEM ON CHIP ARCHITECTURES

(75) Inventors: Doddaballapur N. Jayasimha, Sunnyvale, CA (US); Jeremy Chan, San Jose, CA (US); Liping Guo, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 310 days.

(21) Appl. No.: 13/219,370

(22) Filed: Aug. 26, 2011

(65) Prior Publication Data

US 2013/0051385 A1 Feb. 28, 2013

(51) Int. Cl.
*H04L 12/26* (2006.01)

(52) U.S. Cl.
USPC ........... 370/352; 370/237; 370/238; 370/244; 370/248; 370/392

(58) Field of Classification Search
USPC .............. 370/237, 238, 238.1, 244, 248, 250, 370/299, 351–357, 392, 396, 400, 403, 419, 370/386–388
See application file for complete search history.

(56) References Cited

U.S. PATENT DOCUMENTS

| | | | |
|---|---|---|---|
| 5,948,089 | A | 9/1999 | Wingard et al. |
| 6,182,183 | B1 | 1/2001 | Wingard et al. |
| 6,330,225 | B1 | 12/2001 | Weber et al. |
| 6,578,117 | B2 | 6/2003 | Weber |
| 6,617,877 | B1 | 9/2003 | Cory et al. |
| 6,725,313 | B1 | 4/2004 | Wingard et al. |
| 7,093,024 | B2 | 8/2006 | Craddock et al. |
| 7,120,712 | B2 | 10/2006 | Wingard et al. |
| 7,251,256 | B1 | 7/2007 | Barry et al. |
| 7,325,221 | B1 | 1/2008 | Wingard et al. |
| 8,576,879 | B2 | 11/2013 | Scandurra et al. |
| 2002/0051427 | A1 | 5/2002 | Carvey |
| 2002/0129173 | A1 | 9/2002 | Weber et al. |
| 2002/0196796 | A1 | 12/2002 | Ambe et al. |

(Continued)

FOREIGN PATENT DOCUMENTS

WO   WO 2013/032910 A1   3/2013

OTHER PUBLICATIONS

Wingard, Drew, Socket-Based Design Using Decoupled Interconnects, 2002, 30 pages, Interconnect-Centric Design for Advanced SOC and NOC.

(Continued)

*Primary Examiner* — Kibrom T Hailu
*Assistant Examiner* — Zewdu A Beyen
(74) *Attorney, Agent, or Firm* — Rutan & Tucker, LLP

(57) ABSTRACT

A method for generating headers in packetized protocols for a flexible routing network for a Network on a Chip (NoC) architecture includes generating packets based on transmission traffic received from an initiator or a target connected to a routing network that connects disparate initiators and targets. Logic to generate the packets is in an interface located between the initiator or the target and the routing network. A header portion of a packet is variable in length and includes a header payload and header control information. Each of the header portion and the body portion includes one or more standard sized transmission units. The size of the transmission units and width of the header payload are determined by logic included in the interface. The width of the header payload is determined based on orthogonal groups with each of the orthogonal groups being associated with targets sharing an initiator thread.

19 Claims, 12 Drawing Sheets

(56) References Cited

U.S. PATENT DOCUMENTS

| | | | |
|---|---|---|---|
| 2003/0004699 | A1 | 1/2003 | Choi et al. |
| 2003/0074520 | A1 | 4/2003 | Weber et al. |
| 2003/0118048 | A1 | 6/2003 | Dally et al. |
| 2004/0177186 | A1 | 9/2004 | Wingard et al. |
| 2007/0094429 | A1 | 4/2007 | Wingard et al. |
| 2007/0233918 | A1 | 10/2007 | Check et al. |
| 2008/0144670 | A1 | 6/2008 | Goossens et al. |
| 2008/0151909 | A1 | 6/2008 | Scott et al. |
| 2008/0285562 | A1* | 11/2008 | Scott et al. .................... 370/392 |
| 2008/0320268 | A1* | 12/2008 | Wingard et al. .............. 711/202 |
| 2010/0325318 | A1* | 12/2010 | Desoli et al. .................... 710/29 |
| 2011/0026405 | A1 | 2/2011 | Tagagi et al. |
| 2012/0063395 | A1* | 3/2012 | Ho ................................ 370/329 |
| 2013/0051397 | A1 | 2/2013 | Guo et al. |

OTHER PUBLICATIONS

Weber, Wolf-Dietrich, "Efficient Shared DRAM Subsystems for SOCs", Sonics, Inc., 2001, 6 pages.

OCP (Open Core Protocol) Specification, Release 2.0, OCP International Partnership 2003 OCP-IP Association, pp. 210 total.

Wingard, Drew, "A Non-Blocking Intelligent Interconnect for AMBA-Connected SoCs", Sonics, Inc., CoWare Arm Developer's Conference, Oct. 6, 2005, 39 pages.

Weber, Wolf-Dietrich, et al., "A quality-of-service mechanism for interconnection networks in system-on-chips", 1530-1591/05, 2005 IEEE, 6 pages.

Wingard, Drew: Tiles: "The Heterogeneous Processing Abstraction for MPSoC", Presentation Notes, 2004, Sonics, Inc., 35 p.

Notification of Transmittal of the International Search Report and the Written Opinion of the International Searching Authority for International Patent Application No. PCT/US2012/052288, mailed Nov. 8, 2012, 8 pages, International Searching Authority/US, Alexandria, Virginia, USA.

Notice of Allowance for U.S. Appl. No. 13/219,339 mailed Dec. 9, 2013 11 pages. U.S. Patent and Trademark Office, Alexandria VA USA.

Supplemental Notice of Allowability for U.S. Appl. No. 13/219,339 mailed Jan. 29, 2014 6 pages. U.S. Patent and Trademark Office, Alexandria VA USA.

Non-Final Office Action for U.S. Appl. No. 13/219,339 mailed Apr. 10, 2013 30 pages. U.S. Patent and Trademark Office, Alexandria VA USA.

* cited by examiner

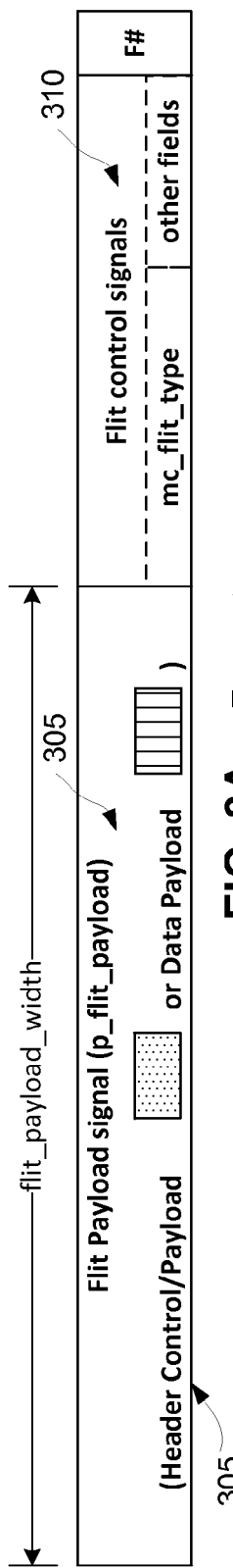
FIG. 3A – Format
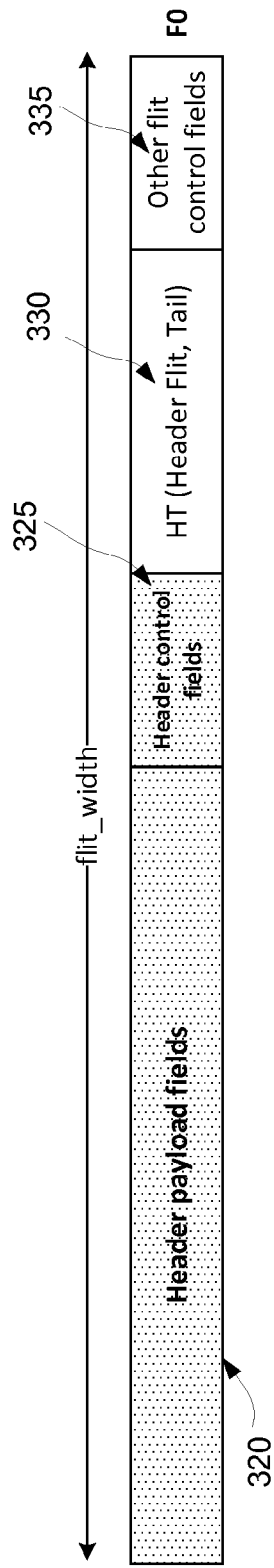
FIG. 3B – 1-flit Header
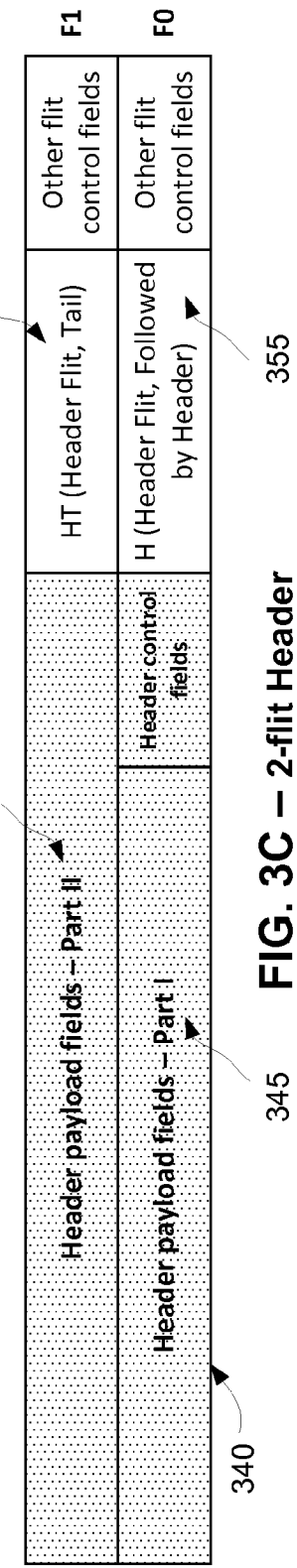
FIG. 3C – 2-flit Header

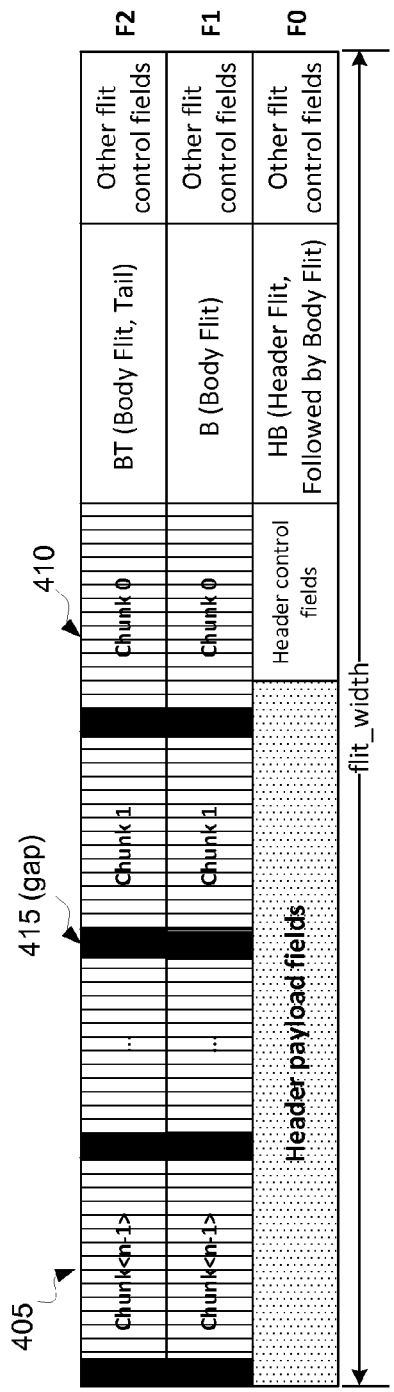
FIG. 4A – 3-Flit Packet
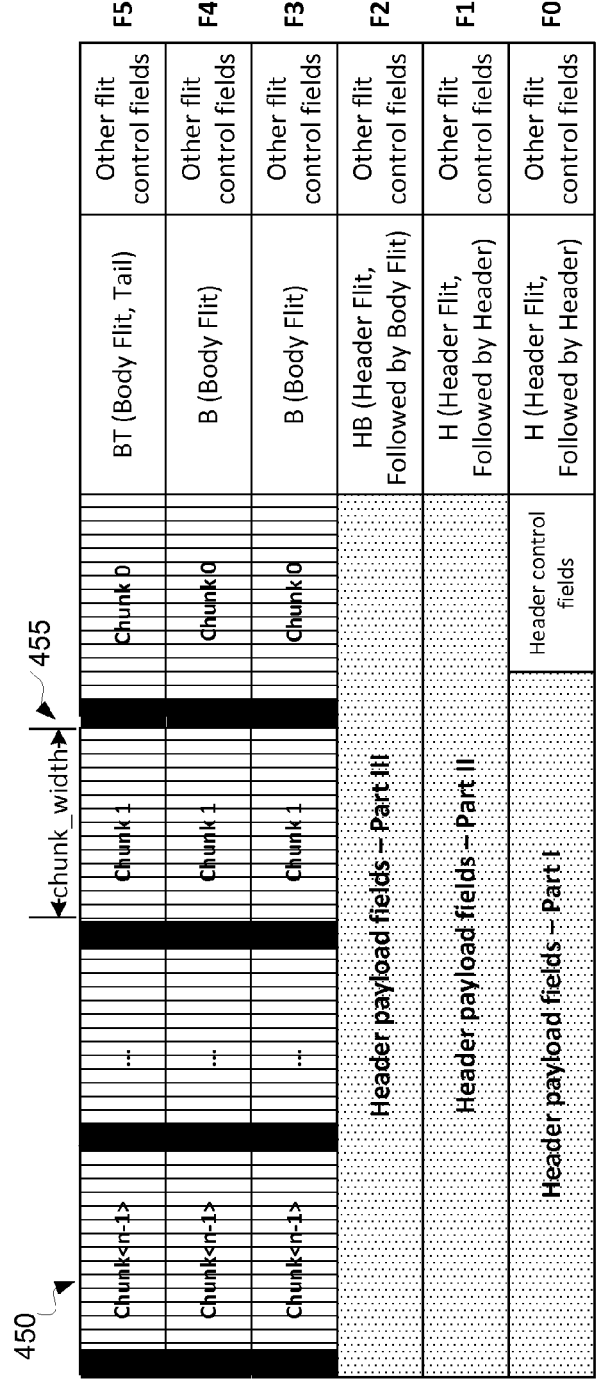
FIG. 4B – 6-Flit Packet

US 8,798,038 B2

EFFICIENT HEADER GENERATION IN PACKETIZED PROTOCOLS FOR FLEXIBLE SYSTEM ON CHIP ARCHITECTURES

NOTICE OF COPYRIGHT

A portion of the disclosure of this patent document contains material that is subject to copyright protection. The copyright owner has no objection to the facsimile reproduction by anyone as long as it appears in the Patent and Trademark Office Patent file or records, but otherwise reserves all copyright rights whatsoever.

FIELD

Embodiments of the present invention generally relate to the field of data routing, and in some embodiments, specifically relate to using flexible length header to route data using routers in a flexible network.

BACKGROUND

In a System on Chip (SoC) environment, many Initiator Intellectual Property cores (IC) and Target Intellectual Property cores (TC) with different capabilities are connected through a network. The differences in the capabilities often require many overheads in timing and space to enable the communication between the ICs and the TCs to occur.

SUMMARY

Some embodiments of the invention may include packetization logic for efficient header generation in packetized protocols for a flexible routing network for Network on a Chip (NoC) architectures which connects disparate initiators and targets. The packetization logic is located at an interface between an initiator or a target and the router network. The packetization logic is configured to receive transmission traffic from the initiator or the target and packetize the transmission traffic into packets. Each packet has a header portion and a body portion. Each of the header portion and the body portion includes one or more standard sized transmission units. The header portion is variable in length and includes a header payload and header control information which includes a routing information and other type of control information. The size of the transmission units and width of the header payload are determined by the packetization logic. Each of the header portion and the body portion includes a type field to indicate its type as either a head, a body, a head followed by another head, a head followed by a body, a head and also a tail, or a body and also a tail.

BRIEF DESCRIPTION OF THE DRAWINGS

The multiple drawings refer to the embodiments of the invention.

FIG. 3A illustrates an example embodiment of a format of a flit.

FIG. 3B illustrates an example embodiment of a one-flit header.

FIG. 3C illustrates an example embodiment of a two-flit header.

FIG. 4A illustrates an example embodiment of a packet that includes a header flit and multiple body flits.

FIG. 4B illustrates an example embodiment of a packet that includes multiple header flits and multiple body flits.

DETAILED DISCUSSION

Figure 1A:
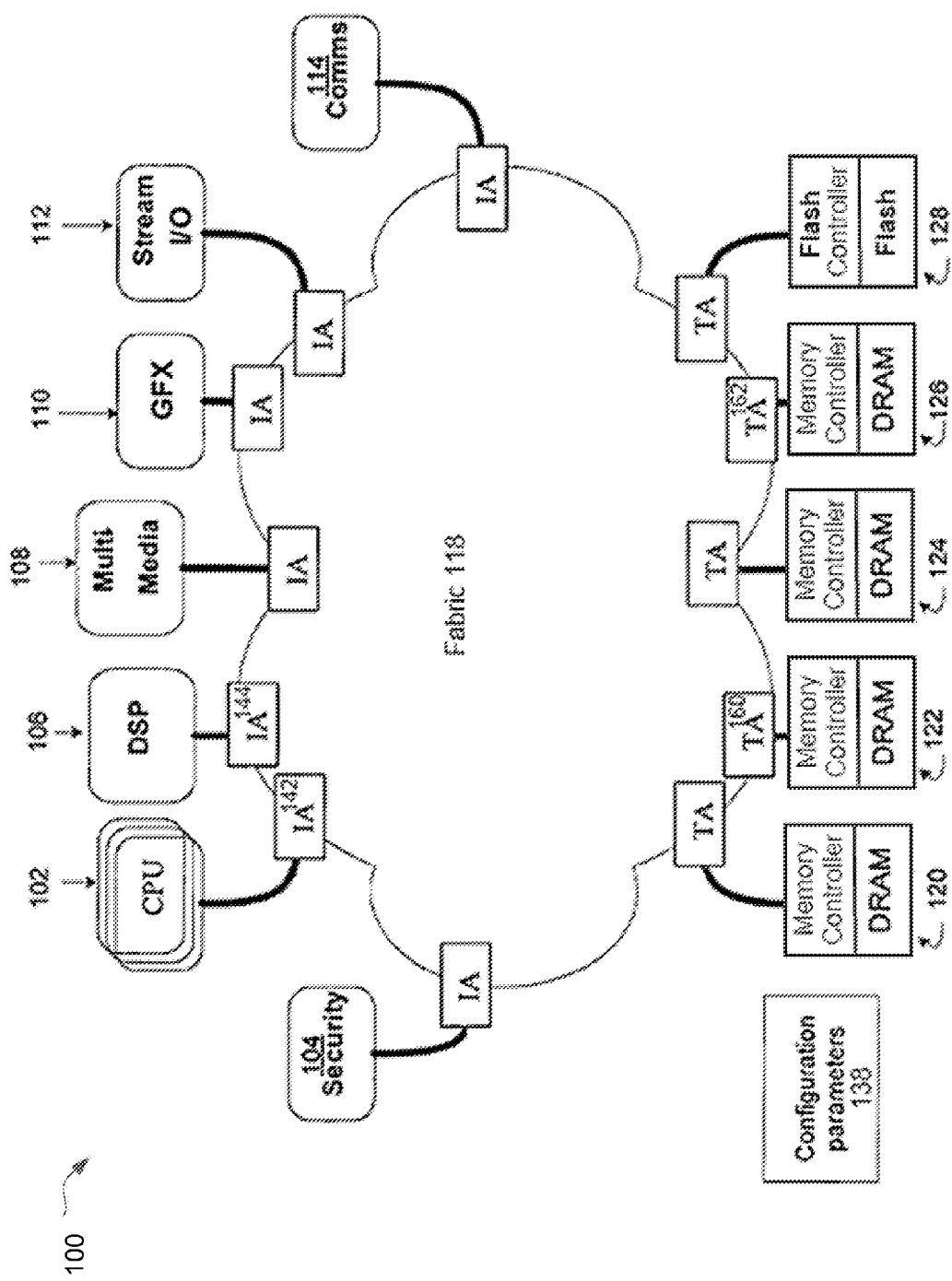
FIG. 1A illustrates a block diagram of an embodiment of a System-on-a-Chip (SoC).

In the following description, numerous specific details are set forth, such as examples of named components, connections, types of circuits, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references (e.g., a first router, a second router, etc.) may be made. However, the specific numeric reference should not be interpreted as a literal sequential order but rather interpreted that the first array is different from a second array. Thus, the specific details set forth are merely exemplary. The specific details may vary from and still be contemplated to be within the spirit and scope of the present invention.

Various methods and apparatus associated with routing information from ICs to TCs through one or more routers using packets with variable length headers are discussed. The methods and apparatus enable generating packet headers in a System on a Chip (SoC) interconnect that takes into consideration the disparate nature and configurability of the ICs and TCs. The methods and apparatus may result in different decoding costs at a fabric interface and at a router element of the interconnect. Sets of connected agents are determined. For each set, a common packet header is determined. Each initiator may not need to send the complete header. Such a header generation scheme may simplify the decoding costs at a target since the position of each subfield is fixed regardless of the number of connected initiators and targets. The subfields may be sorted so that it is possible that the initiators do not need to accommodate the area costs for unneeded fields. Each of the ICs and TCs may be associated with an interface. In a request network, the interface may include a packetization logic to packetize messages received from the initiators into packets with each packet having a header payload and a body payload. The header payload includes routing information and control information. The routing information may indicate the specific route that the packet is to travel to go from an IC (or the source) to a TC (or the destination) or from a TC to an IC. The control information may include burst information, command information, etc. The header payload may be different for different pair of ICs and TCs because the routing information may be different. As such, they may have different length.

The methods and apparatus described herein allow a heterogeneous set of source components with different header lengths in flits, different initiator or upstream router elements, to be able to connect to a same downstream router element that merges the routing of the traffic from this heterogeneous set of source components. Although all of the heterogeneous set of source components can have different header lengths in flits feeding the same router element, all the headers in a group are broken up into one or more standard transmission parts that all have a common size width for that group. The method includes generating packets based on transmission traffic received from an initiator or a target connected to a routing network that connects disparate initiators and targets. Each of the packets includes a header portion and a body portion. The logic to generate the packets is in an interface located between the initiator or the target and the routing network. The header portion is variable in length and includes a header payload and header control information which includes a routing information and other type of control information. Each of the header portion and the body portion includes one or more standard sized transmission units. The size of the transmission units and width of the header payload are determined by logic included in the interface.

Overview

In general, in an interconnection network, an initiator agent (IA) has the visibility into the capabilities of all the target agents (TAs) it communicates. Hence, an IA can generate only the header signal groups for each TA. This results in a compact header for each IA and TA pair. This approach requires the IA to dynamically associate a header with each packet that is sent for each TA it communicates with. The TA, in turn, has to decode signal groups based on the IA. This may cause timing delay and may require complex decoding logic.

For some embodiments, a static header composition may be used. An IA uses the same header composition regardless of where the packet is sent. Similarly, a TA uses the same header composition. A signal group may be included in the header by the IA if that group is needed at any of the TAs that the IA communicates with. Using this static header composition approach may result in more efficient timing since the header generation is static even though there may be a minimal cost in having a larger header. Given that the packet width is usually determined by the data payload, this approach may provide some flexibilities in the header generation.

IP Cores and Fabric

FIG. 1A illustrates a block diagram of an embodiment of a System-on-a-Chip. Diagram 100 includes multiple initiator IP cores (IC) and multiple target IP cores (TC) that communicate read and write requests as well as responses to those requests over a fabric 118. The fabric 118 may also be referred to as a packet-based switch network because the data transferred within the fabric is in the forms of packets. Some examples of an IC may include a CPU IP core 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

Each IC may have its own initiator agent (IA) (e.g., IA 142, IA 144, etc.) to interface with the fabric 118. Some examples of a TC may include DRAM IP core 120 through DRAM IP core 126 and FLASH memory IP core 128. Each TC may have its own target agent (TA) (e.g., TA 160, TA 162) to interface with the fabric 118. Each of the DRAM IP cores 120-126 may have an associated memory controller. Similarly, the flash memory 128 is associated with a flash controller. All of the ICs 102-114 and TCs 120-128 may operate at different performance rates (i.e. peak bandwidth, which can be calculated as the clock frequency times the number of data bit lines (also known as data width), and sustained bandwidth, which represents a required or intended performance level). The fabric 118 may be part of an integrated circuit, such as System-on-a-Chip (SoC).

Routing Network

Figure 1B:
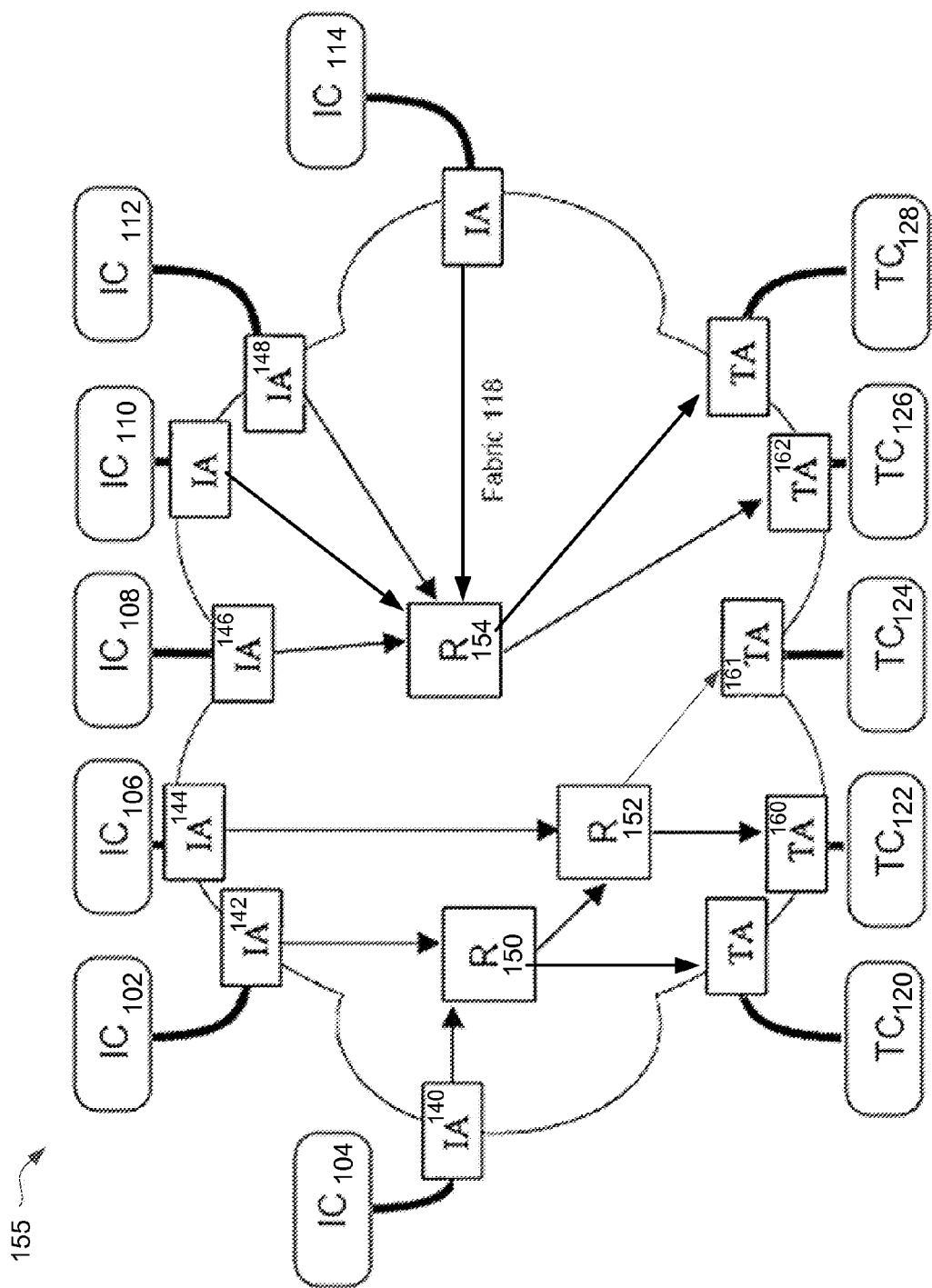
FIG. 1B illustrates a block diagram of an embodiment of a fabric.

FIG. 1B illustrates a block diagram of an embodiment of a fabric and routers included in the fabric. Diagram 155 is similar to the diagram 100 but with the addition of the routers in the fabric 118. The diagram 155 illustrates a request network where the information flows from the ICs and IAs to the TAs and TCs. Although not illustrated, there is a corresponding response network that connect the TCs and the TAs to the IAs and ICs. The routers may be used to route packets within the fabric 118 from a source location (e.g., the ICs 102-114) to a destination location (e.g., the TCs 120-128) in the integrated circuit. There may be multiple routers in the fabric 118. The number of routers may be implementation specific (e.g., topology used, area requirement, latency requirement, etc.). The data sent from the IC 102 to the TC 122 may be packetized by packetizing logic associated with the IA 142 before being sent into the fabric 118. The packets may pass through the routers 150 and 152. The packets may then be depacketized by depacketizing logic associated with the TA 160 when they leave the fabric 118. Similarly, the data sent from the IC 108 to the TC 126 may be packetized by packetizing logic associated with the IA 146 before being sent into the fabric 118. The packets may pass through the router 154. The packets may then be depacketized by depacketizing logic associated with the TA 162 when they leave the fabric 118. Also illustrated in FIG. 1B are the data flowing from the router 152 to the TA 161 of the TC 124, and the data flowing from the IC 112 to the IA 148 and the router 154.

The packets may be broken into small pieces called flits (or flow control units) when they are sent between two routers or between an IA and a router or between a router and a TA. A flit may take several cycles to transfer. A smallest physical unit of information at the physical layer that is transferred across one physical link in one cycle is called a phit. A flit can consist of one or more phits. The router implements routing and flow control functions required to buffer the incoming flits and forward them to their intended destinations. The router is pipelined at flit level and its architecture follows a virtual channel (VC) router and configured for Network-on-Chip (NoC) applications. The router may include multiple links that are used in a shared fashion as virtual channels. Each VC is associated with a VC identification (VC ID) number and may hold the state needed to coordinate the handling of the flits of a packet over a channel. This state may identify the output channel of the current router for the next hop of the route and the state of the virtual channel (idle, waiting for resources, or active). The VC may also include pointers to the flits of the packet that are buffered on the current router and the number of flit buffers available on the next router.

Figure 1C:
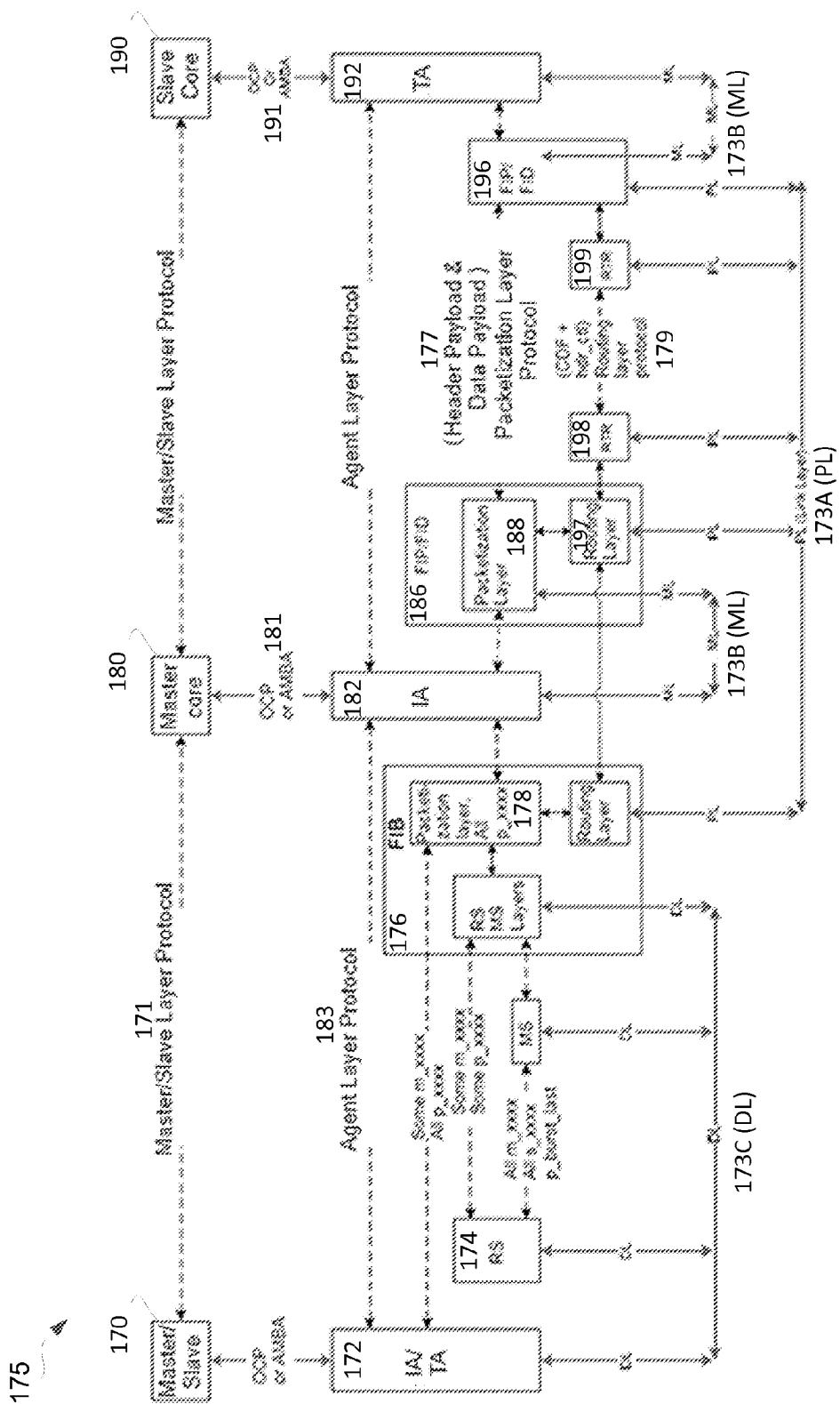
FIG. 1C illustrates a block diagram of an embodiment of interfaces and protocol layers and packetized protocol layers used by components of a network.

FIG. 1C illustrates a block diagram of an embodiment of interfaces and protocol layers and packetized protocol layers used by components of a network. Diagram 175 includes master cores 170, 180 and a slave core 190. Each of the master cores 170, 180 and the slave core 190 may correspond to the IC or TC illustrated in FIGS. 1A and 1B. The diagram 175 also includes fabric interface logic 186 and 196, each of which may include packetization and depacketization logic. Requests from the master core 180, such as command to get data from memory, are expressed in a standard interface protocol such as OCP or the Advanced Microcontroller Bus Architecture (AMBA) protocol or using a proprietary interface protocol. The requests are then received by the IA 182.

The request may then be packetized by the fabric interface logic 186, and the packets are sent into the fabric 118. The packets may be routed by the routers 198 and 199 as flits before arriving at the fabric interface 196. The fabric interface 196 then depacketizes the packets into messages and then send the messages to the TA 192. The TA 192 then sends the messages to the slave core 190 using the OCP or AMBA or any socket protocol 191. Each of the routers 198 and 199 may be configured to perform some link width conversion such that an accumulated link width conversion by all of the routers will ensure that the packets arriving at the fabric interface 196 will be as expected by the fabric interface 196. The link width conversion module 280 (shown in FIG. 2) may perform the conversion operations. When there is a response message by the slave core 190, the response message is transmitted to the TA 192 and then packetized by the fabric interface 196. The routers 198 and 199 may again perform the link width conversion such that when the packets associated with the response message arrive at the switch interface 186, they will match with what is expected by the fabric interface 186.

The double-arrowed solid lines in FIG. 1C represent physical links connecting the components of the flexible network. The horizontal double-arrowed dotted lines drawn between the components indicate that a special type of layer protocol is used between those components that may or may not be connected to one another via any physical link. For example, at the packetization layer 188, a packetization layer protocol 177 is used for communication. The packetization layer 188 is responsible for packetization/depacketization, reformatting the data into a common data format (CDF) and vice versa. The functionality of the packetization layer 188 may exist in the fabric interface packetizer (FIP), fabric interface depacketizer (FID). The FIP and FID are responsible for facilitating packing and/or unpacking the external socket transactions on the request network and on the response network.

At the routing layer 197, a routing layer protocol 179 is used for communication between the routers. The routing layer 197 is responsible for handling routing and width conversion related functionality. As shown in FIG. 1C, the functionality of the routing layer 197 may exist in the routers and in the FIP and FID. The RS 174 is responsible for data transfer of the flits between adjacent routers for flow control and for virtual channel management. A layer protocol 183 is also used for communications between an IA request side and a TA request side, and between a TA response side and an IA response side. Communication among the components illustrated on the bottom of FIG. 1C is based on message links (ML) 173B, packet links (PL) 173A, etc. For example, the ML 173B is used to connect the IA 182 with the fabric interface 186; the PL 173A is the interface that connects the fabric interface 186 with the router 198, and the router 199 with the fabric interface 196. It is packet based.

The message link (ML) is the interface between initiator agents (IA) and the fabric interface packetizer (FIP) or fabric interface depacketizer (FID), and between the target agent (TA) and its associated FID or FIP. The ML protocol is a synchronous point-to-point unidirectional protocol with a master and a slave. It defines the interface bundles internal to the agents. The ML is used to capture the socket information from the socket interface protocols such as OCP or AMBA AXI. The ML is used as the agent internal interface protocol at the interface between the agents (IA or TA) and the packetization logic or the depacketization logic.

Figure 2:
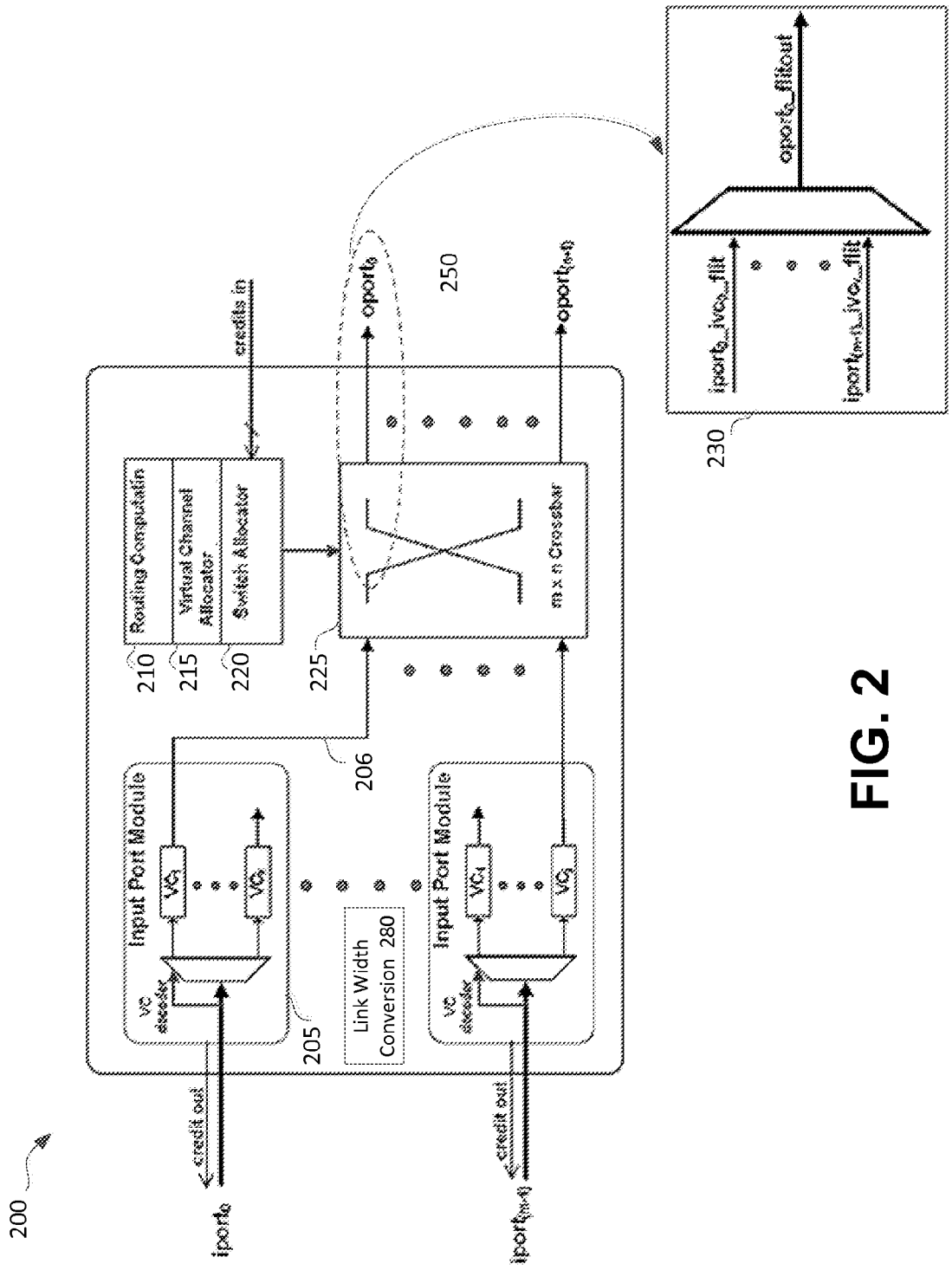
FIG. 2 illustrates some components of an embodiment of a router.

FIG. 2 illustrates some components of an embodiment of a router. Router 200 may be composed of decision-making modules, which govern the shared resources. The decision-making modules may include the input-buffering module 205, the route-computing module 210, the virtual channel allocation module 215, the switch allocation module 220, and the flow control module. The shared-resources may include the input VC buffer storage, the crossbar switch 225, and the output ports 250. The shared buffer storage is based on each input port and may be implemented as a content addressable memory (CAM). When active, the decision-making modules may coordinate with each other through the states of the input VCs. To advance, a flit may undergo several operations. An incoming header flit needs to go through the operations of buffer write (BW), route computation (RC), virtual channel allocation (VA), switch allocation (SA), switch traversal (ST), and link traversal (LT) before it arrives at the next hop. The body and tail flits of the same packet inherit the outgoing VC from the header flit and may only proceed through operations of BW, SA, ST, and LT. Among those operations, the RC and VA may be considered as packet level procedures and the rest of the operations may be considered as flit-level procedures.

The BW refers to an action of loading the newly arrived flits into the correct input port IVC storage. The RC refers to a process of extracting the route information from the header flit of a packet at each fabric network hop. The per hop route information may include an output port ID and an output VC ID. The VA refers to a process of arbitrating among various packets requesting for the same output VC and allocating the requested output VC to the arbitration winner. Only one output VC can only be allocated to one packet at any time. The SA refers to a process of arbitrating among the output VCs belonging to the same output port and determining which of the output VCs is to be granted access to an output port. An output port can only be allocated to one output VC at any time. The ST refers to a process in which a flit leaves the VC storage associated with an input VC of an input port and traverses to the output port. The LT refers to a process in which a flit leaves the current hop and propagates along the physical link connecting the fabric network entities (FID, FIP, and router).

The decision-making modules manage both the packet-level procedures and the flit-level procedures. The input port module 205 is configured to load the incoming flits into the intended VC buffer storage. The route computing module 210 is configured to examine the routing field in a header flit of a packet and computes the output port and the output VC through which the packet should be routed.

The packets are routed from the source to the destination using an appropriate deadlock-free routing scheme. The routes may be computed at the source or at each hop. For illustration purposes, a source based routing scheme is assumed; however, it should be noted that embodiments of the invention may also be used with other routing schemes. A designer knows exactly what is wanted for each IP core including the appropriate data width requirement. The designer also has different requirements in getting the packets from one IP core to another IP core, including the paths, the latency, the number of hops, etc. All of the requirements are taken into consideration to derive at the final structure of the fabric so that the designer's requirements are met. The final structure may be a number of routers, and the routers may have similar or different channel width for their input and output ports.

The structure of the fabric is defined in a connectivity table. The definition may be in one of two formats: simplified or detailed. In the simplified format, only the identification of the initiator agent (IA), the fabric interface packetizer (FIP), the fabric interface depacketizer (FID), the routers (RTR), and the target agent (TA) are included. Following is an example of a connectivity table for a request network.

```
connectivity_table {   ia1 fi1 r00 r10 fia taa
                       ia1 fi1 r00 r10 fib tab
                       ia1 fi1 r00 r11 fie tae
                       ia1 fi1 r00 r11 fig tag
                       ia1 fi1 r00 r12 fii tai  }
```

The response network in the simplified format may be created by inverting the structure of the request network. In the detailed format, the designer may specify all aspects of the route from the IA to the TA including the data widths, the input and output interfaces of the routers, the names and connections for the FIs and the routers, and the VCs involved. Each line of the connectivity table specifies the initiator name, initiator thread, the width between the initiator and the FIP, the FIP name, the width between the FIP/RTR and the next RTR/FID, RTR based VC name, input interface number of the RTR, shared memory depth of the VC, RTR name, output interface number of the router (these 6 entries are repeated as often as needed for the RTRs needed to support the route), the width between the RTR and the FID, the FID name, the width between the FID and the target and finally the target name. Following is an example of the connectivity table for a request network in the detailed format.

```
connectivity_table
  { ia1 0 64 fiia1 32 VC0 0 −1 r00 0 32 VC0 0 −1 r30 0 32 fita1 64 ta1 }
```

The above example describes the route between ia1 thread 0 and ta1. The width between the IA and the FIP and between the FID and the TA are 64 bits wide. All the widths between the FIP/RTR and the next RTR/FID are 32 bits. The route goes into plin0 and out of plout0 of both routers r00 and r30. It also enters VC0 of both routers. No shared memory depth is specified (a value other than "−1" specifies a depth).

Referring to FIG. 2, the virtual channel allocation (VA) module 215 is configured to arbitrate among the packets requesting for the same output VC and allocates the output VC to the arbitration winner if and only if the output VC has not been granted to any other input VCs at the time. The switch allocation (SA) module 220 is configured to arbitrate among output VCs belonging to the same output port and determines which output VC is granted to access the output port 250 of the crossbar switch 225. Block 230 illustrates the multiple flits competing for the output port. As mentioned, the source routing allows the designer to specify the output port that the designer wants the packet to pass through. As such, it may be possible that multiple flits try to request for the same output port or resource. This is resolved by arbitration. It may be noted that there are two levels of arbitration. The first arbitration is for multiple input VCs competing for an output VC and performed by the VA module 215. The second arbitration is for multiple output VCs competing for an output port and performed by the SA module 220. The connection 206 illustrates an example connection from the VC buffer storage to an output port associated with the crossbar switch 225.

Upon completion of the switch allocation operations, a flit waiting in the VC storage is granted access to an output port 250 of the crossbar switch 225. That flit may propagate through the crossbar switch 225 and the output port 250 to arrive at the next hop. The process of a flit propagating through the crossbar switch 225 is referred to as switch traversal. The process of a flit propagating along the inter-router physical link is referred to as link traversal.

CDF and Headers

The CDF may include a base data word field (W), a byte enable field (E), a byte data field (B), and a word data field (C). When the network is a response network, a field R is used. The least commonly used field is field C; next is the field B, then field E, and then the field W. The field W is the most commonly used field.

For some embodiments, all data transmissions within the fabric are based on the CDF. A unit of data using the CDF is referred to as a chunk or a CDF chunk. The width of each field in the CDF is fixed and is the same for every TA belonging to a group referred to as a header group (described below). The SoC may have multiple header groups. The header group determines the minimum base data word and its width for the links associated with the header group. It is assumed that the request and response networks are separate, and the CDFs for the request and response networks are separately derived. In general, the base data word is derived from the header group. The information from the initiator and the target is concatenated to the base data word forming the CDF chunk.

For a request network, when a link carries the data payload, then the field W is mandatory. All other fields E, B and C are optional. Some targets have them while some don't. To make the router design simple, the presence of the other fields in a CDF chunk is determined based on a rule referred to as a postfix rule. Based on this rule, the presence of an optional field such as the field E, B or C in a link implies that all of the fields to its right are included in the CDF chunk on that link (except when the fields are not needed in the header group). For example, if the field C is present (or needed), then the field B and the field E are present in the CDF chunk carried on that link, unless these two fields B and E are not required in the header group. Similarly, when the field B is present (or needed), then the field E is present in the CDF chunk carried on that link, unless the field E is not required in the header group. All of the required fields for a particular CDF chunk together form a required-CDF-chunk.

For some embodiments, the header requirements for independent groups of connected TAs may be determined based on orthogonal groups. In other words, all the TAs in the same orthogonal group may share the same header structure or format. The orthogonal groups can be determined based on the information provided in the connectivity table. Following is an example algorithm that may be used to generate orthogonal groups for the request network.

Step 1: Form a set whose elements are the set of all the TAs communicating with the IA thread.
Step 2: Form the transitive closure of this set using the relation, "if 2 elements share a TA, then they can be combined to form a union."

The result yields a set of orthogonal groups. Different orthogonal groups do not share or have a common TA. The union of all the orthogonal groups is the full set of all of the TAs.

Following is an example illustrating how the orthogonal groups are generated using the set transitive closure method described above. In this example, there are four IA threads with their connected TAs. The information may be derived from the connectivity table.

(IA thread 0) I0 = {TA0, TA1} (TAs communicating with IA thread 0)
(IA thread 1) I1 = {TA0, TA2} (TAs communicating with IA thread 1)
(IA thread 2) I2 = {TA3} (TA communicating with IA thread 2)
(IS thread 3) I3 = {TA1} (TA communicating with IA thread 3)
Step 1: Header Groups (HG) = {{TA0, TA1}, {TA0, TA2}, {TA3}, {TA1}}
Step 2 - After first closure:   HG = { {TA0, TA1, TA2}, {TA3}, {TA1 }}
         After second closure:  HG = { {TA0, TA1, TA2}, {TA3}}

From the example above, two orthogonal groups are formed. The first orthogonal group contains the target agents TA0, TA1, and TA2, and the second orthogonal group contains the target agents TA3. In the response network, a TA thread can have connectivity with more than one IA, and the orthogonal groups containing the IAs may be formed in a similar manner as the request network.

As mentioned above, all the TAs in a orthogonal group shares the same header format. Following is an example algorithm that may be used to generate a header payload for the request network.

For each TA in an orthogonal group, view all request network signals that can be mapped to a orthogonal group.
Merge the signals of each TA. Assign the signal width in the header to be the maximum among all the signal widths of the TAs. At the end of this step, all the signal groups with their maximum widths are used to specify the width of the header payload.
Sort the signals according to any convenient order.
Calculate the offset (see the last column of the table below) for each signal based on the following method:
  The offset for the first signal is 0;
  The offset for the subsequent signal is the offset of the previous signal plus the width of the previous signal.

It may be noted that the headers may be narrower for the response network as compared to the request network. A similar procedure is followed for the generation of the header payload for the IA orthogonal groups for the response network. For some embodiments, a width of a base data word is defined as a minimum word size among all of the IC and TC associated with a orthogonal group. The following Table 1 illustrates how the header is built (last column) on the request side for an orthogonal target group consisting of two TAs: TA0 and TA1. In the second and third columns, the word "enable" means the signal is present. The constructed header for this example is 44 bits wide with each signal group boundary indicated by the "offset" field in the last column. Examples of header signals and subfields (or header payload) are illustrated in the first column.

TABLE 1

Construction of Header Membership Data Structure for TA Orthogonal Group

| PML signals mapped to header | PL TA0 request (enable, width) | PL TA1 request (enable, width) | Data structure (enable, width, offset) |
| --- | --- | --- | --- |
| p_initid | (1, 4) | (1, 2) | (1, 4, 0) |
| p_maddrspace | (1, 1) | (0, n/a) | (1, 1, 4) |
| p_mburstprecise | (1, 1) | (0, n/a) | (1, 1, 5) |

TABLE 1-continued

Construction of Header Membership Data Structure for TA Orthogonal Group

| PML signals mapped to header | PL TA0 request (enable, width) | PL TA1 request (enable, width) | Data structure (enable, width, offset) |
| --- | --- | --- | --- |
| p_mburstseq | (1, 3) | (1, 3) | (1, 3, 6) |
| p_mburstsinglereq | (1, 1) | (1, 1) | (1, 1, 9) |
| p_memd | (1, 3) | (1, 3) | (1, 3, 10) |
| p_packorder | (0, n/a) | (0, n/a) | (0, n/a, n/a) |
| p_mlittleendian | (1, 1) | (1, 1) | (1, 1, 13) |
| p_maddr | (1, 20) | (1, 26) | (1, 26, 14) |
| p_mburstlength | (1, 6) | (1, 4) | (1, 6, 40) |
| p_sresp | (0, n/a) | (0, n/a) | (0, n/a, n/a) |
| p_mbyteen | (0, n/a) | (0, n/a) | (0, n/a, n/a) |
| p_info | (0, n/a) | (0, n/a) | (0, n/a, n/a) |

Header Flit

FIG. 3A illustrates an example embodiment of a format of a flit. As mentioned, a packet may be broken up into one or more flits. For example, a header may be a one-flit header or a two-flit header. The first flit of the packet is referred to as the header flit. The header flit holds information about the packet's route (e.g., the destination address) and sets up the routing behavior for all subsequent flits associated with the packet. The header flit may also include the VC number that it is associated with. The header flit may be followed by zero or more body flits. The body flits contain the actual payload of data. The final flit of the packet is referred to as a tail flit. The tail flit may perform some bookkeeping to close the connection between the two routers.

The flit 305 may include a flit control field 310 and a flit payload field 315. The flit control field 310 may include information to indicate the type of flit. For example, the flit may be a header flit and it is also a tail, the flit may be a header flit and it is followed by another header flit, etc. The flit control field 310 may also include other control information. It may be noted that the information in the flit control field 310 and in the payload field 315 is processed from the position of the least significant bit (LSB).

The flit control field 310 may also include information about the number of inactive words in the payload portion. For example, when the number of inactive word is one, the router may skip processing the information included in the last word of the payload once the processing is completed for the active words. The area occupied by the inactive words may be referred to as a gap, and no data may be stored in the gap. The flit payload field 315 may include a header payload or a data payload depending on whether the flit is a header flit or a data flit.

FIG. 3B illustrates an example embodiment of a one-flit header. The header 320 includes one flit F0. The flit F0 includes a flit type field 330 and a header control field 325. The flit type field 330 indicates that it is a header flit and also a tail. The header control field 325 includes the routing information and other control information. There may also be other flit control fields 335. The remaining portion of the header 320 is the header payload field.

FIG. 3C illustrates an example embodiment of a two-flit header. The header 340 includes two flits F0 and F1. The first flit F0 includes the flit type field 355, which indicates that it is a header flit and it is followed by another header flit. The second flit F1 includes the flit type field 360, which indicates that it is a header flit and also a tail. The header 340 also includes a first header payload field 345 as part of the first flit F0 and a second header payload field 350 as part of the second flit F1. It may be noted that the header control field 325 is located only in the first flit F0 regardless of how many flits is included in the header.

Header Payload and Data Payload

FIG. 4A illustrates an example embodiment of a packet that includes a header flit and multiple body flits. In a request network, the packetization logic inside the initiator is configured to determine the size of the header and the address to be included in the header. The designer of the network derives the information about chunk size statically. The packetization logic performs the breaking up of the data into the chunks using the information determined by the designer. The packet 405 includes a header portion and a body portion. The header portion of the packet 405 in this example is a one-flit header similar to the example illustrated in FIG. 3B. It includes the flit type information, the header control fields and the header payload fields. In this example, the flit type for the flit F0 indicates that it is a header flit and followed by a body flit. The body portion of the packet 405 includes the body flits F1 and F2 and their flit type information and data fields 410. In this example, the flit type of the flit F1 indicates that it is a body flit, and the flit type of the flit F2 indicates that it is a body flit and also a tail flit.

FIG. 4B illustrates an example embodiment of a packet that includes multiple header flits and multiple body flits. The packet 450 includes header flits F0, F1 and F2 and body flits F3, F4 and F5. The flit type for the flits F0 and F1 indicate that they are header flits and followed by another header flit. The flit type for the flit F2 indicates that it is a header flit and followed by a body flit. The flit type for the body flits F3 and F4 indicates that they are body flits and followed by another body flit. The flit type for the body flit F5 indicates that it is a body flit and is also a tail flit. As illustrated, the body flits include the data payload and the header flits include the header payload. It may be noted that the data payload may be grouped as data chunks with chunk data width 455. Similarly, the header payload may also be grouped as header chunks. In this example, the data chunks may also include gaps 415 (described below). It may be noted that even when it is determined that the orthogonal group has multi-flit headers, some initiators and paths or partial paths do not need to generate multi-flit headers based on their socket characteristics. Even though a packet protocol is used, those initiators may generate only the first part of the header (i.e., only the first or first few flits). The FID takes care to properly interpret them based on the flit encoding or the downstream external socket characteristics.

The header may be packetized based on (1) the need for all of the header control information to be present in the first flit of the header portion, (2) the width of the data chunk, and (3) the latency-area considerations determined by derivation (possibly with input by the designer). Thus, at a particular link, the payload width of the chunk is determined either by the width of the data chunk at that link or by the width of the header payload chunk. The multiple flit headers may be generated by grouping the information that is commonly used in the first part of the header and the information that is less commonly used in the last part of the header. These flits may be eventually be combined at a common merging point. It may be noted that the width of the header payload chunk is the same for the entire orthogonal group.

It is possible that multiple header payload chunks may be used to fit the full header. The determination to do so may be based on at least the following two reasons: (1) to save area when the header payload width is much wider than the orthogonal group CDF chunk width (e.g., wider than k bits, where k is a product or derivation dependent constant such as k=8), and (2) to reduce the header size when only specific initiators/targets use certain header payload signals (see examples in Table 1). In such cases, these header signals are part of a separate payload chunk and are selectively generated by the initiators and consumed by the targets. The derivation algorithm needs to take care of the second optimization carefully, and the FID at the target needs to take care with the proper interpretation of the flit encoding. For example, a flit encoding of HT (head and also tail) or HB (head followed by body) when the FID expects H (head followed by more head) or more header flits may mean that the optional header signals have to assume default values when the PML message is constructed. Following is an example pseudo code that may be used to determine the width of the header payload chunk:

If (header_width <= og_chunk_cdf_required_width + k) then
    payload_chunk_width = header_width,
else if header_control_width > og_chunk_cdf_required_width then
    payload_chunk_width = header_control_width,
else payload_chunk_width = og_chunk_cdf_required_width where header_width is the total width of all the header payload signals (data and control), where k is a product or derivation dependent constant (e.g., k=8), and where og_chunk_cdf_required_width is the width of the required-CDF-chunk in the orthogonal group. Note that it is possible for the designer to determine the set of header signals to be included in the first header chunk or the first header flit. Note also that it is possible for the derivation to not split a header signal into different chunks.

At the FIP, the header payload signals are placed into one or more header payload chunks and then transmitted as flits on the outgoing link of the FIP. A link with a link width conversion ratio of "c" may have a flit of up to "c" header chunks. Note that the header signals may occupy more than one flit. When the header payload chunk(s) are constructed, it is likely that the trailing portion of the last header chunk is unused because of the packetization. It is also possible that the derivation algorithm may choose to not use the trailing portions of a header payload chunk since it may place a subfield beginning at a new header payload chunk. The unused portions of the header are also considered as part of the header, since the header, except for the header control signals, are passed uninterpreted by the router network. Only the FID needs to be aware of any gaps that arise in the header.

Figure 5A:
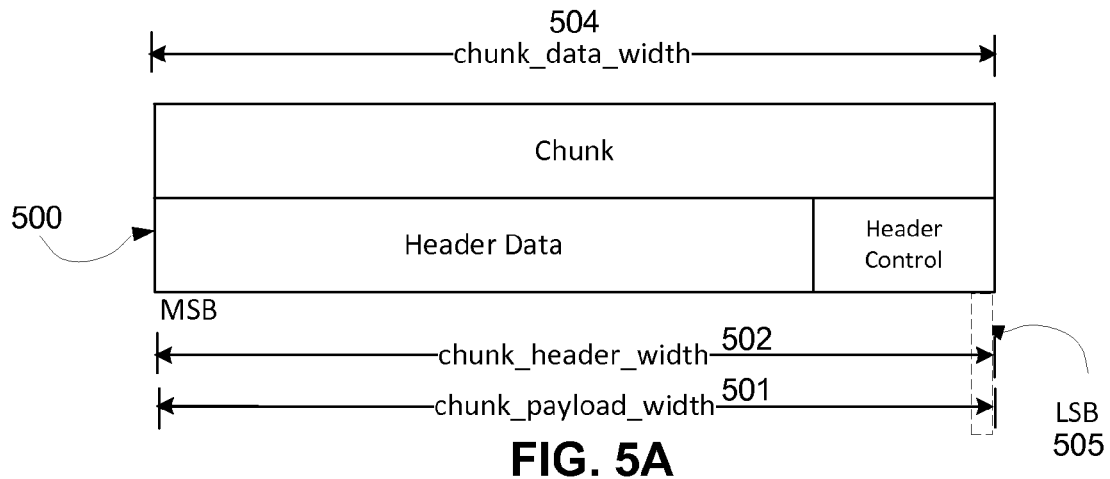
FIGS. 5A-5C illustrates example embodiments of chunk alignment.
Figure 5B:
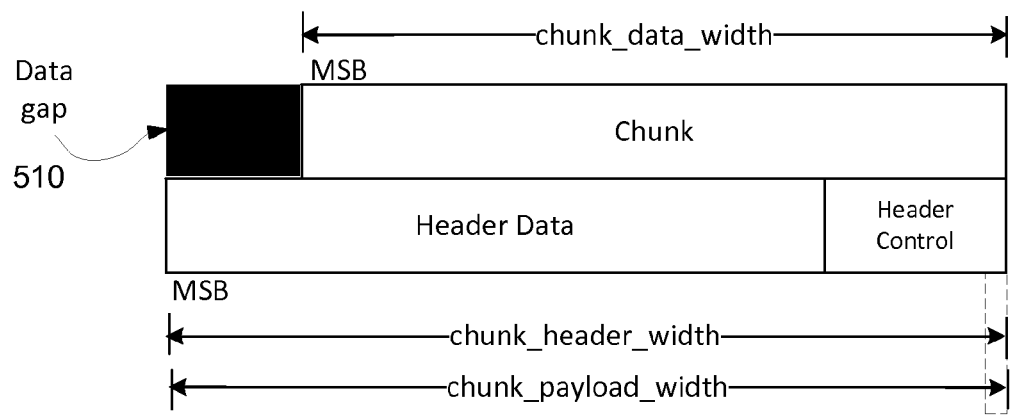
Figure 5C:
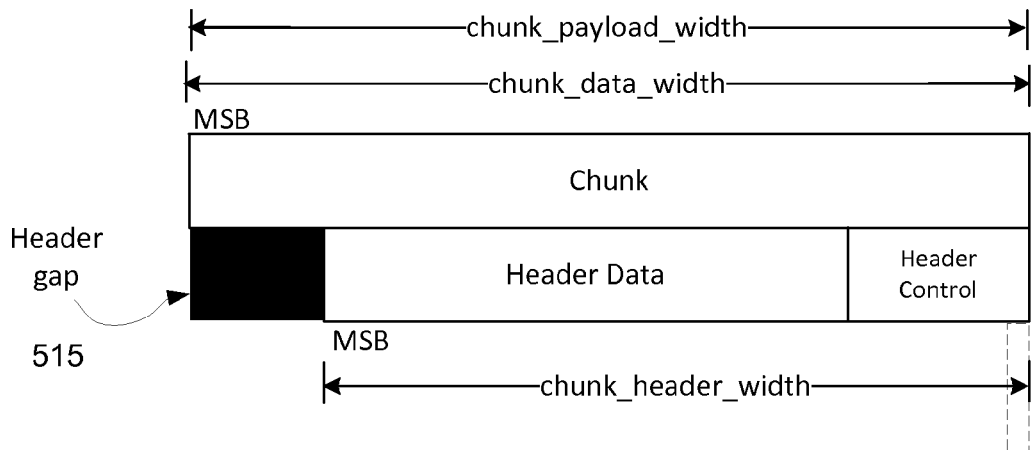

FIG. 5A illustrates an example embodiment of chunk alignment. Block 500 illustrates the alignment of the first chunk of the data payload and the first chunk of the header payload which includes the header control field and the header data. The chunk payload width 501 is defined as the maximum of the chunk header width 502 and the chunk data width 504. For some embodiments, each of the header and data chunks are aligned based on the least significant bits (LSB). When the chunk header width and the chunk data width don't match, there is a gap in either the body portion of the packet or the header portion of the packet. FIG. 5B illustrates an example embodiment of chunk alignment where there is a gap 510 in the body portion. In this example, the chunk data width 511 is narrower than the chunk header width 512. FIG. 5C illustrates an example embodiment of chunk alignment where there is a gap 515 in the header portion. In this example, the chunk data width 516 is wider than the chunk header width 517. The gaps 510 and 515 may not need to be explicitly tracked.

Figure 6A:
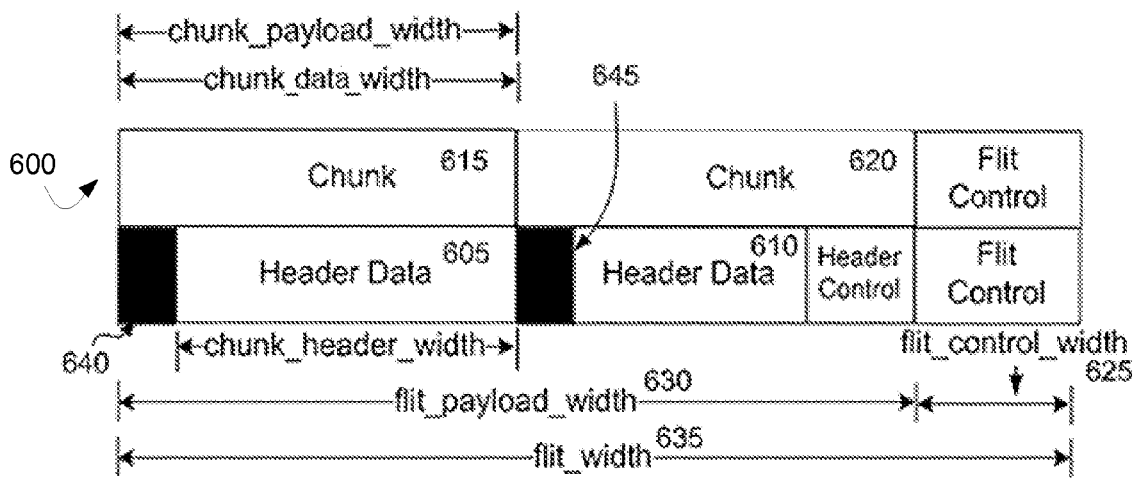
FIGS. 6A-6B illustrates example embodiments of a structure of a flit relative to the data chunk and the header chunk.
Figure 6B:
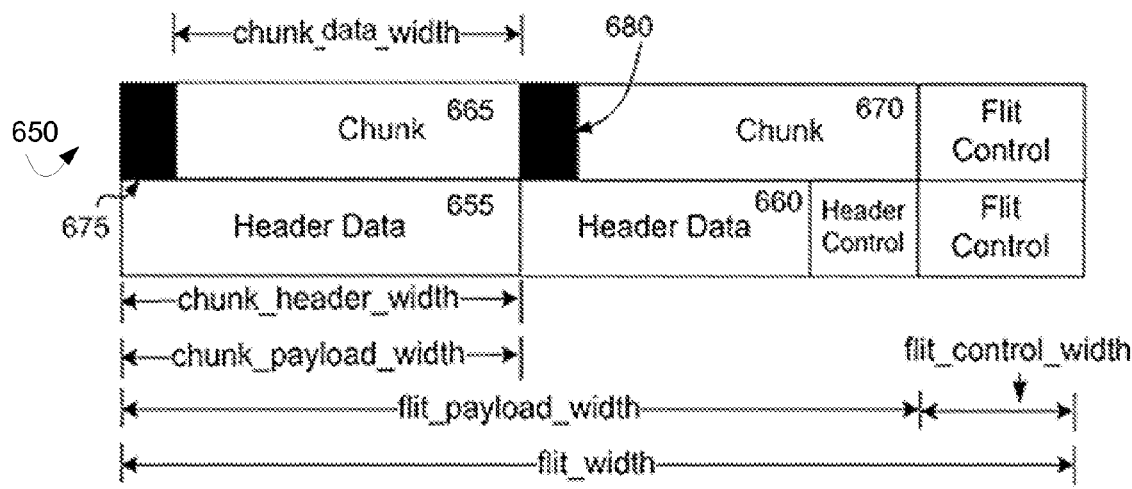

FIG. 6A illustrates an example embodiment of a structure of a flit relative to the data chunk and the header chunk. The packet 600 includes one header flit and one data flit. The header flits includes two header data chunks 605 and 610, and the data flits includes two data chunks 615 and 620. The width of each flit 635 includes the width of the flit control field 625 and the width of the flit payload 630. As illustrated with the packet 600, the width of the header data chunk 605 or 610 is narrower than the width of the data chunk 615 or 620, resulting in the gaps 640 and 645. FIG. 6B illustrates another example embodiment of a structure of a flit relative to the data chunk and the header chunk. The packet 650 also includes one header flit and one data flit. The header flits includes two header data chunks 655 and 660, and the data flits includes two data chunks 665 and 670. In this example, the width of the data chunk 665 or 670 is narrower than the width of the header chunk 655 or 660 resulting in the gaps 675 and 680.

The link width conversion at the router (described below) uses a link width conversion ratio to take care of the adjusting for the alignment and the widths. The link width conversion ratio indicates the width of the link relative to the base data word size for the orthogonal group. For some embodiments, the flit payload width 630 is determined based on the following formula:

Flit payload width=width conversion ratio*chunk payload width.

The flit width 635 is determined based on the following formula:

Flit width=flit payload width+flit control width

Link Width Conversion

Figure 7A:
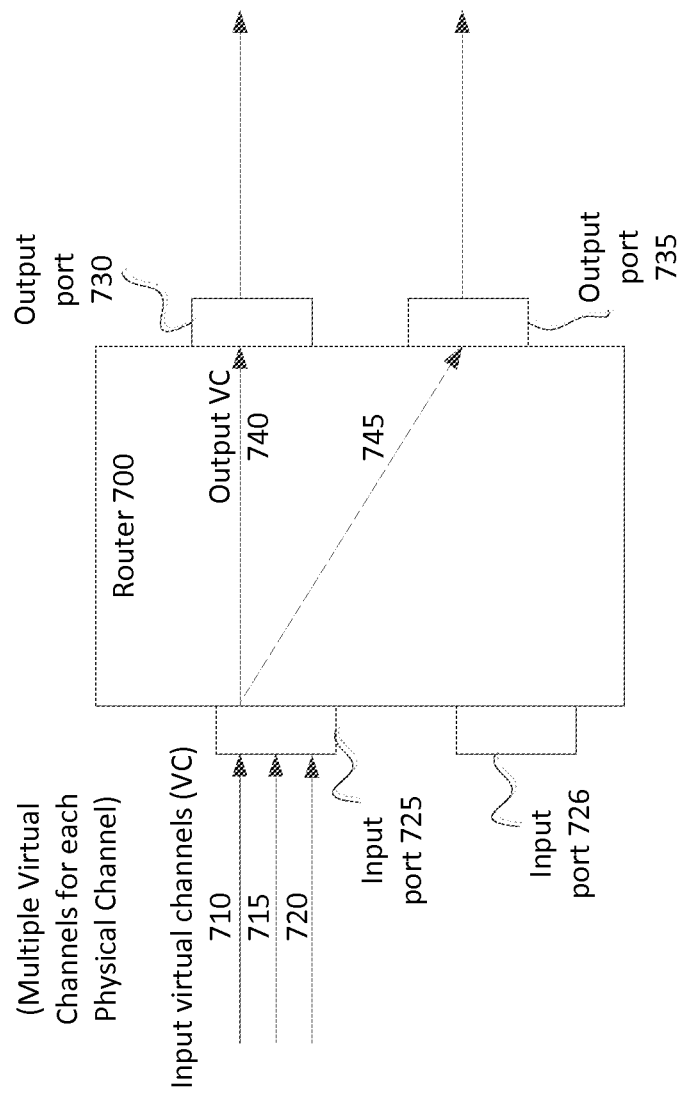
FIG. 7A illustrates an example of input and output ports of a router.

FIG. 7A illustrates an example of input and output ports of a router. Router 700 may include multiple input ports 725, 726 and multiple output ports 730, 735. The input port 725 may be associated with multiple input VCs 710, 715, 720. The packets or their associated flits may be received by the router 700 via the input VC 710 and then forwarded by the router 700 to the next hop via the output port 730. In operation, one input VC can be mapped to only output VC per route computation. As described in FIG. 2, the VA module 215 allocates the output VC, and the SA module 220 allocates the output port.

The packets include control or routing information to indicate the path that the fabric 118 is required to use to forward the packets to their intended destination. For example, the next hop for an incoming packet can be determined by looking at the first four (4) most significant bits (MSBs) of the routing field of the header flit where the first two MSBs may be used to determine the output port, and the next two MSBs may be used to determine the output VC. The width of each of the input ports 725, 726 and the width of the output ports 730, 735 of the router 700 may be configured independently. When the width of an input port and an output port pair is not the same, link width conversion may need to be performed. The specific type of link width conversion to be performed depends on the router connectivity and the associated widths of the ports. Based on the input port to output port width ratio, there may be three different types of link width conversion, including (a) Narrow-to-wide (N2W) conversion when the incoming narrower flits are accumulated to form a wider outgoing flit, (b) Wide-to-narrow (W2N) link width conversion when the incoming wider flits are broken up to match with the outgoing narrow flits, and (c) no width conversion when the incoming flits are passed through unmodified to the output port. The link width conversion module 280 (shown in FIG. 2) may be configured to perform these conversion operations.

For some embodiments, the link width conversion ratio between the incoming flits and corresponding outgoing flits associated with the same packet may be determined based on using a ratio of a width parameter of the incoming link and a width parameter of the outgoing link (e.g., the PL link 173A illustrated in FIG. 1C). When an input VC of an input port has connections to multiple output ports (as illustrated with the output VC 740 and 745), it may be associated with more than one width conversion ratio. It may be noted that an input VC of a router may not be associated with a W2N link width conversion and a N2W link width conversion in a router to the same output port at the same time. However, an input VC may be associated with multiple wider output ports under N2W link with conversion based on the same (e.g., 1 to 4: 4 input flits packed into 1 output flit) or different conversion ratios (e.g., 1 to 4 and 1 to 6). Similarly, an input VC may be associated with multiple narrower output ports under W2N link width conversion (e.g., 4 to 1:1 wider input flit broken into 4 narrower output flits) based on the same or different conversion ratio. For example, the output VC 740 may have more the input VCs 710 and 715 mapped to it and the VA module 215 may receive multiple requests simultaneously.

When performing a W2N conversion (e.g., 1 wider input flit broken into 4 narrower output flits), there may be unused portion in the header. The unused portion may be identified as the inactive words. This information may be included in the flit control field. The inactive words are normally in the trailing portion of the header payload, not in the middle. In that sense, the data in the header payload is front loaded. When processing the header, the logic in the router may examine the flit control field and ignore the inactive words.

Figure 7B:
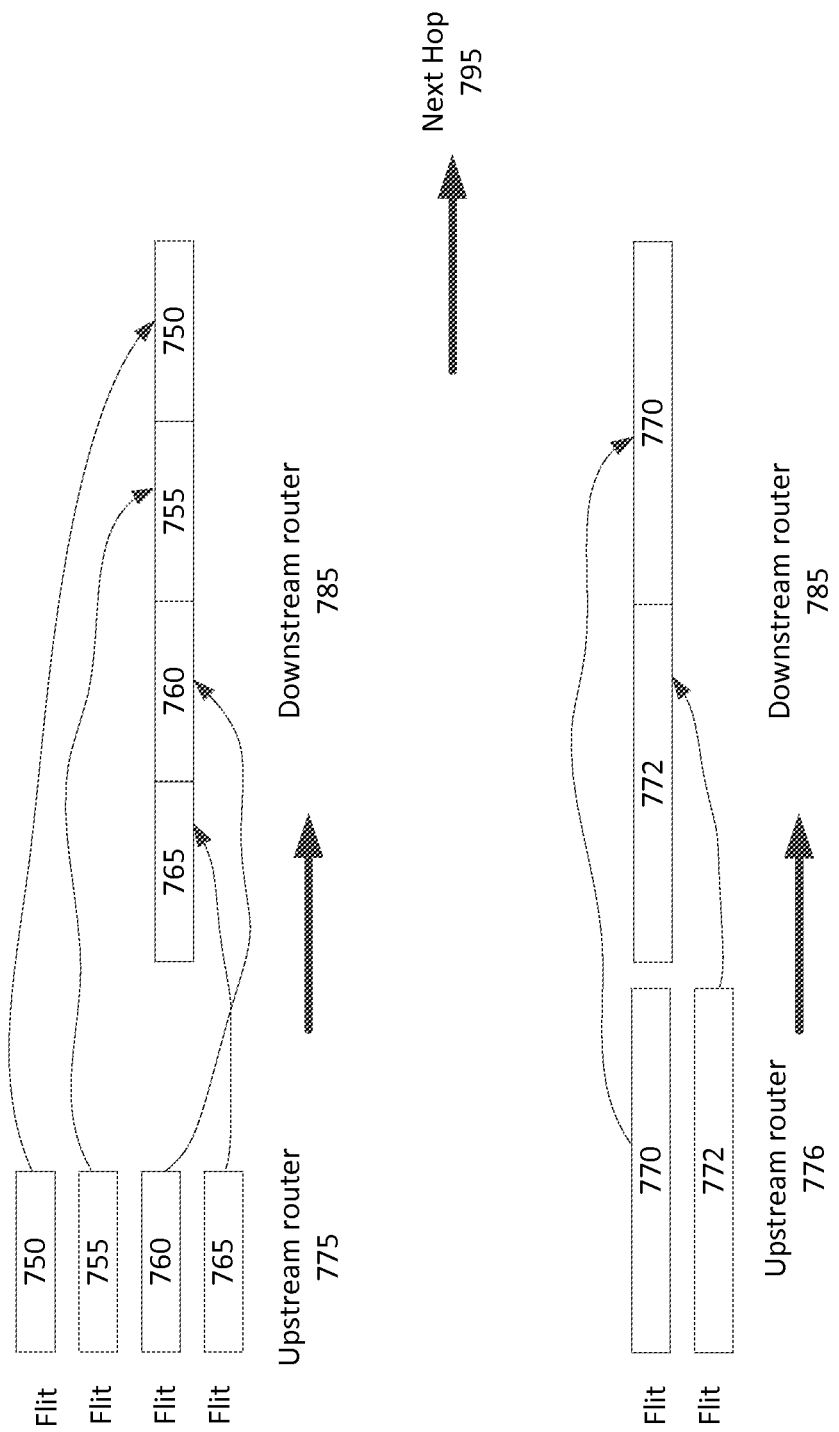
FIG. 7B illustrates an example of link width conversion.

FIG. 7B illustrates an example of link width conversion. In this example, there are two upstream routers 775 and 776, and one downstream router 785. The upstream routers 775, 776 and the downstream router 785 may be configured to have different output port width and input port width. For example, the width of an output port of the upstream router 775 may be 64 bits while the width of the input port of the downstream router 785 may be 256 bits. As such, the downstream router 785 may need to accumulate four flits 750, 755, 760 and 765 from the upstream router 775 before the accumulated flits may be ready for arbitration in the downstream router 785. Similarly, the width of the upstream router 776 may be 128 bits, and the downstream router 785 may need to accumulate two flits 770 and 772 from the upstream router 776 before the accumulated flits may be ready for arbitration in the downstream router 785. This is referred to as narrow-to-wide link conversion. The link conversion module 280 may perform link conversions for the flits coming from the upstream routers 775 and 776. The upstream router 775 may be forwarding one flit at a time. As such, the downstream router 785 may wait until all four flits 750, 755, 760 and 765 are received before arbitration is performed by the VA module and the SA module in the downstream router 785. When access to an output port of the downstream router 785 is granted, the four flits 750, 755, 760 and 765 may be forwarded together as a chunk to the next hop 795. If the width of the input port of the downstream router 785 is 16 bits instead of 256 bits, a wide-to-narrow link conversion may be performed. In this situation, the flit 750 may be broken up into smaller flits.

For some embodiments, the link width conversion module 280 of a downstream router may pack or unpack the flits received from the upstream router, update the flit control filed so that the flit type of the incoming flits matches with the flit type of the outgoing flits, and other functions. The link width conversion module 280 may not modify the data included in the payload portion.

For some embodiments, a minimum amount of storage to be allocated to the VC storage is configured based on a width conversion ratio associated with a particular input VC. As mentioned, each input VC is associated with its own reserved VC storage and a shared VC storage. When there is a N2W link width conversion, there should be enough storage to support a maximum N2W link width conversion for the particular VC. Thus, the reserved VC storage for each input VC may need to have enough entries to support the N2W width conversion. For example, when there is a link width conversion ratio of 1:4, the VC storage needs to include at least 4 entries in order to support 1:4 conversion ratio. Even when the flits are placed into the shared VC storage, they are still identifiable as being associated with their corresponding input VCs. It may be possible for a header flit associated with a packet to be stored in the reserved VC storage while the body flits and tail flit associated with the same packet may be stored in the shared VC storage.

Flow Control

Figure 8:
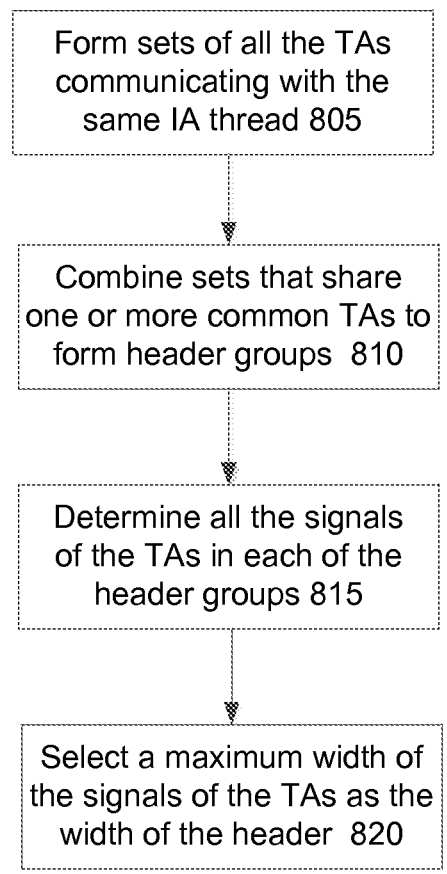
FIG. 8 illustrates a diagram of a process flow that may be performed by a router according to some embodiments.

FIG. 8 is a flow diagram for an example process that may be used to form orthogonal groups according to some embodiments. The process may be performed by the packetization logic included in the IC. At block 805, a set whose elements are the set of all the TAs communicating with the IA thread is formed. At block 810, the sets of TAs that share one or more common TAs are combined. The result from block 810 yields a set of orthogonal groups. All the TAs in a orthogonal group shares the same header format. At block 815, the request network signals that can be mapped to a orthogonal group are determined. At block 820, the width of the header associated with the orthogonal group is determined to be the maximum among all of the signal widths of the TAs.

Computer-Readable Media

In an embodiment, a non-transitory computer readable storage media contains instructions, which when executed by a machine, the instructions are configured to cause the machine to generate a software representation of an apparatus that includes one or more routers in a fabric of a Network on a Chip (NoC) which encompasses systems including an integrated circuit (IC). The network includes packetization logic for efficient header generation in packetized protocols for a flexible routing network for a Network on a Chip (NoC) architecture which connects disparate initiators and targets. The packetization logic is located at an interface between an initiator or a target and the routing network and is configured to receive transmission traffic from the initiator or the target and packetize the transmission traffic into packets. Each packet has a header portion and a body portion. Each of the header portion and the body portion includes one or more standard sized transmission units. The header portion is variable in length and includes a header payload and header control information which includes a routing information and other type of control information. The size of the transmission units and width of the header payload are determined by the packetization logic. Each of the header portion and the body portion includes a type field to indicate its type as either a head, a body, a head followed by another head, a head followed by a body, a head and also a tail, or a body and also a tail.

Simulation and Modeling

Figure 9:
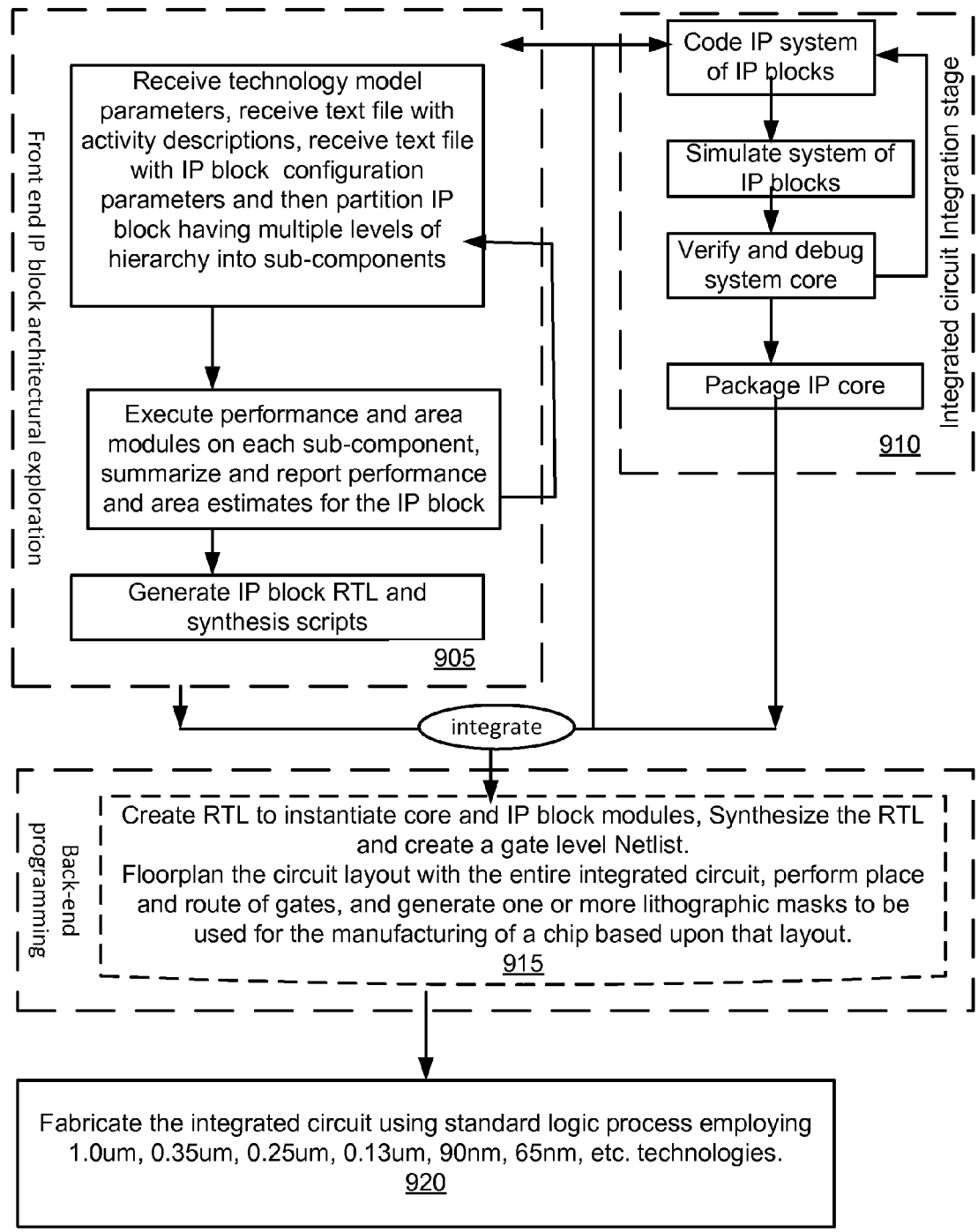
FIG. 9 illustrates a flow diagram of an embodiment of an example of a process for generating a device, such as a System on a Chip While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

FIG. 9 illustrates a flow diagram of an embodiment of an example of a process for generating a device, such as a System on a Chip, in accordance with the systems and methods described herein. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 905, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 910, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 915, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 920, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
packetization logic is configured to generate an efficient header in packetized protocols for a flexible routing network for a Network on a Chip (NoC) architecture which connects disparate initiators and targets;
wherein the packetization logic is located at an interface between at least a first initiator or a first target and the flexible routing network and a second initiator or a second target and the flexible routing network, and is configured to receive transmission traffic from the first and the second initiators or the first and second targets and packetize the transmission traffic into a first packet from the first initiator or the first target and a second packet from the second initiator or the second target for transmission to an input port of a downstream router element;
wherein the first packet comprises a first header portion and a first body portion, and the second packet comprises a second header portion and a second body portion, wherein the first header portion and the second header portion are initially variable in length, and wherein the first header portion initially has a different length than the second header portion;
wherein each of the first and the second header portions include a header payload and header control information which includes routing information and other types of control information;
wherein the packetization logic is configured to dynamically customize the lengths of the first header portion and the second header portions by breaking the first header portion and the second header portion into a group of outgoing transmission units that all have a common width suitable for the width of the input port of the downstream router element;
wherein each of the first and the second header portions and each of the first and the second body portions includes a type field to indicate either a head, a body, the head followed by another head, the head followed by the body, the head and also a tail, or the body and also the tail; and wherein the width of the header payload is determined based on orthogonal groups, with each of the orthogonal groups being associated with targets sharing an initiator thread, and wherein a maximum width of information accepted by the targets sharing the initiator thread is used as the common width of the header payload for a particular orthogonal group.

2. The apparatus of claim 1, wherein the width of the header payload is determined based on a pairing of an initiator and a target in the flexible routing network and based on the routing information from the initiator to the target in the flexible routing network.

3. The apparatus of claim 1, wherein the packetization logic is configured to wrap header payload information into one or more of the outgoing transmission units.

4. The apparatus of claim 1, wherein inactive words are added into or trimmed from the outgoing transmission units associated with the header payload by link width conversion performed by a router in the flexible routing network.

5. The apparatus of claim 4, wherein the header payload information is processed by the router in the flexible routing network from a least significant bit (LSB), and wherein more commonly used header payload information is grouped toward an LSB portion of the header payload and less commonly used header payload information is grouped away from the LSB portion of the header payload.

6. The apparatus of claim 5, wherein the header payloads are sorted such that some paths from the initiators to the targets have wider header payloads while other paths to the same target have narrower header payloads until a point of merger.

7. The apparatus of claim 6, wherein the packetization logic determines the width of the header payload based on balancing trade-offs between area cost and timing cost, and wherein the packetization logic determines a size of the outgoing transmission units based upon at least a smallest width of links the packet will traverse through in the flexible routing network on its way to its intended destination.

8. The apparatus of claim 1, wherein the routing information includes a source address, a destination address, and hops between the source address and the destination address, wherein the header payload information includes a starting address, a command type, and a burst length, and wherein the first body portion and the second body portion includes a data payload.

9. The apparatus of claim 8, wherein a size of an outgoing transmission unit is a flit, wherein the first header portion and the first body portion is composed of one or more flits, and wherein only a first flit of the first header portion includes the header control information, and wherein the type field is included in each of the flits of the first header portion or the first body portion.

10. The apparatus of claim 9, wherein each flit includes a flit payload and a flit control field, and wherein based on a narrow-to-wide width conversion occurring at a first router of the flexible routing network, the flit payloads of multiple incoming flits are packed into one wider flit payload of an outgoing flit, and wherein based on a wide-to-narrow width conversion occurring at a second router of the flexible routing network, a flit payload of one incoming flit is unpacked into multiple narrower outgoing flit payloads of multiple outgoing flits.

11. The apparatus of claim 10, wherein the packetization logic and all components including the first and second routers in the flexible routing network examine the flit control field to determine how to process the flit payload.

12. A non-transitory computer readable storage media containing instructions, which when executed by a machine, the instructions are configured to cause the machine to generate a software representation of the apparatus of claim 1.

13. A method for generating headers in packetized protocols for a flexible routing network for a Network on a Chip (NoC) architecture, the method comprising:
generating packets based on transmission traffic received from at least a first initiator or a target and a second initiator or the target, both an at least first initiator or the target and a second initiator or the target are connected to the flexible routing network for the Network on a Chip (NoC) architecture that connects disparate initiators and targets, packetizing the transmission traffic into a first packet from the first initiator or the target and a second packet from the second initiator or target for transmission to an input port of a downstream router element, wherein the first packet comprises a first header portion and a first body portion, and the second packet comprises a second header portion and a second body portion, wherein the first header portion and the second header portion are initially variable in length, and wherein the first header portion initially has a different length than the second header portion wherein packetization logic to generate the packets is in an interface located between the first initiator or the target and the flexible routing network and the second initiator or the target and the flexible routing network, wherein the first packet comprises the first header portion and the first body portion, and the second packet comprises the second header portion and the second body portion, wherein the first header portion and the second header portion are initially variable in length, wherein the first header portion initially has a different length than the second header portion, wherein each of the first and the second header portions include a header payload and header control information which includes routing information and other types of control information, wherein the packetization logic is configured to dynamically customize the lengths of the first and the second header portions by breaking the first header portion and the second header portion into a group of outgoing transmission units that all have a common width suitable for a width of the input port of the downstream router element,
wherein a size of the group of outgoing transmission units and a width of the header payload are determined by the packetization logic included in the interface, and wherein the width of the header payload is determined based on orthogonal groups, with each of the orthogonal groups being associated with targets sharing an initiator thread, and wherein a maximum width of information accepted by the targets sharing the initiator thread is used as the common width of the header payload for a particular orthogonal group.

14. The method of claim 13, wherein the width of the header payload is determined based on a pairing of an initiator and a target in the flexible routing network and based on the routing information from the initiator to the target in the flexible routing network, and wherein header payload information is wrapped into one or more of the outgoing transmission units.

15. The method of claim 14, wherein inactive words are added into or trimmed from the outgoing transmission units associated with the header payload by link width conversion performed by a router in the flexible routing network, wherein the header payload information is processed by the router in the flexible routing network from a least significant bit (LSB), and wherein more commonly used header payload information is grouped toward an LSB portion of the header payload and less commonly used header payload information is grouped away from the LSB portion of the header payload.

16. The method of claim 15, wherein the header payloads are sorted such that some paths from the initiator to the target have wider header payloads while other paths to the same target have narrower header payloads until a point of merger, and wherein the width of the header payload is determined based on balancing trade-offs between area cost and timing cost.

17. The method of claim 13, wherein the routing information includes a source address, a destination address, and hops between the source address and the destination address, wherein the header payload information includes a starting address, a command type, and a burst length, and wherein the body portion includes a data payload.

18. The method of claim 17, wherein a standardized size transmission unit is a flit, wherein the header portion and the body portion is composed of one or more flits, wherein only a first flit of the header portion includes the header control information, and wherein a type field is included in each of the flits of the header portion or the body portion, wherein each flit includes a flit payload and a flit control field.

19. The method of claim 18, wherein based on a narrow-to-wide width conversion occurring at a first router of the flexible routing network, flit payloads of multiple incoming flits are packed into one wider flit payload of an outgoing flit, and wherein based on a wide-to-narrow width conversion occurring at a second router of the flexible routing network, the flit payload of one incoming flit is unpacked into multiple narrower outgoing flit payloads of multiple outgoing flits.

* * * * *